United States Patent Office  3,812,063
Patented May 21, 1974

3,812,063
POLYESTER PREPOLYMER USEFUL FOR COATING AND A METHOD OF PREPARING THE SAME
Tadasu Kimura and Juichi Kobayashi, Otake, and Hideo Nakamoto, Yamaguchi, Japan, assignors to Mitsubishi Rayon Company Limited, Tokyo, Japan
No Drawing. Filed Mar. 8, 1971, Ser. No. 122,150
Int. Cl. C08g 39/10
U.S. Cl. 260—9          29 Claims

ABSTRACT OF THE DISCLOSURE

A polyester prepolymer which is cross-linkedly hardened by radiation of radioactive energy comprises a backbone chain formed from a non-crystalline polyester of a molecular weight of 300 to 500 having a hydroxyl value of 20 to 200 mg. KOH/g.; and a pendent side chain attached to the backbone chain in a proportion of not lower than 0.5 but not exceeding 7.0 of the side chain with respect to 1,000 molecular weight of the backbone chain and containing at least two ester groups and at least one α β-olefinically unsaturated group.

---

The present invention relates to a polyester prepolymer useful for coating compositions and a method of preparing the same. The particularly relates to a cross-linkedly hardening polyester useful for forming a film coating having excellent coating features through curing by utilizing radioactive energy such as electric dissociation beams and ultraviolet rays or by action of a radical polymerization catalyst, and a method of preparing the same.

Recently, owing to the remarkable development of the charged particle accelerator, especially, a low voltage, large power electron accelerator, the method of radioactively curing a polymeric film coating applied on a surface of a substrate article by action of the electron beams has been observed with public attention and interest. Such public interest is derived from the facts that (1) the radiation curing of the polymeric resin film coating is completed at a lower temperature in a shorter time than those of the conventional heat curing for film layers of a coating solution, (2) the film coatings which are cured radioactively have coating properties equal or superior to those of the conventional heat-cured film coatings, and (3) the solvent for the prepolymer sensitive for the radio-active energy can be entirely cured into the film coating. Whereas the solvent for the conventional prepolymer suitable for the heat-curing is undesirably evaporated at the high temperature of the heat curing step and the evaporated vapor of the solvent is disadvantageous due to the resultant health hazard.

The radiation curing method for coating prepolymer as stated above is based on the principle that polymerizable unsaturated groups of the component compounds contained in the coating composition are activated and cured into an insoluble and infusible film coating, owing to formation of inter- or intra-molecular cross-linkings between the component compound molecules by the effect of radioactive energy.

It is well-known that coating compositions such as a composition of unsaturated polyester resin and unsaturated vinyl monomer, a composition of ethylene glycol dimethacrylate and unsaturated vinyl monomer and a composition of unsaturated acrylic resin and unsaturated vinyl monomer, are usable for the radiation curing process utilizing the action of electron beams. The conventional coatings which are obtained from the above compositions of the unsaturated polyester resin and unsaturated vinyl monomer by the radiation of electron beams, have fairly good coating properties but have some disadvantages, such as insufficient weathering resistance due to a remainder of insufficiently cured or uncured, unsaturated compound, unsatisfactory fixedness to the substrate article surface and insufficient flexibility.

Accordingly, a conventional coating composition suitable for the radiation curing process is effective only in a restricted field. Also, a coating composition mainly containing ethylene glycol dimethacrylate can be cured by the radiation of an electron beam, but the resultant film coating has insufficient desirable properties.

Unsaturated acrylic resins usable for a coating composition capable of being cured with radioactive energy may be selected from the following prepolymers.

(i) Unsaturated acrylic resin which is prepared from a primary acrylic polymer containing a glycidyl group of

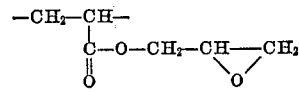

and an α, β-ethylenically unsaturated carboxylic acid, and composed of the following polymeric units;

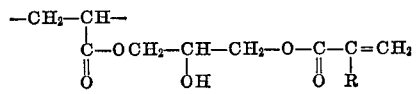

or

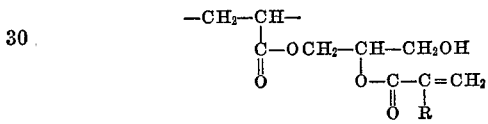

wherein R is an hydrogen atom or a lower alkyl group.

(ii) Unsaturated acrylic resin which is prepared by an addition reaction of a primary acrylic polymer containing a carboxylic group of

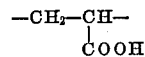

with vinyl monomer containing a glycidyl group, and composed of the following polymeric unit;

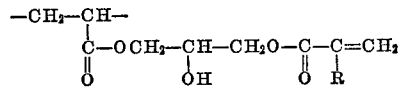

wherein R is as defined above.

(iii) Unsaturated acrylic polymer prepared by an additional reaction wherein a diisocyanate such as tolylene diisocyanate and a vinyl monomer containing an hydroxy group such as hydroxyl-ethyl methacrylate are added to a primary acrylic polymer containing an hydroxyl group in the formula;

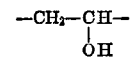

and composed of the following polymeric unit;

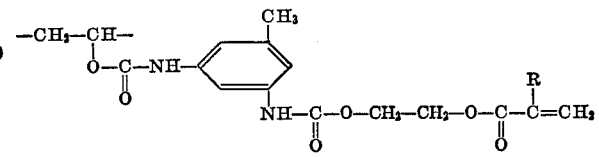

wherein R is as defined above.

The above prepolymer has a disadvantage in that the primary acrylic polymer tends to cross-link inter- or intra-molecularly therewithin during the addition reaction for the preparation of the unsaturated acrylic prepolymer. This causes an undesirable gelation of the resultant coating composition. Particularly, the above tendency is very conspicuous when a low molecular weight compound such as vinyl monomer is used as a solvent for the primary acrylic polymer.

Generally, when unsaturated prepolymer, which is capable of polymerization, is cured by radiation of electrolytic radioactive rays or ultraviolet rays, the coating layer of the prepolymer shrinks remarkably during the process. This shrinkage results in undesirable stress in the resultant film coating. The stress causes low impact resistance, insufficient fixedness to the substrate article surface and low flexibility.

The inventors had developed a study for obtaining the coating polymer composition having no disadvantages stated above basing upon a study concerning oil-free alkyd resins having an excellent fixedness to the substrate article surface and superior flexibility.

The inventors found through the study the fact that prepolymer containing a backbone chain formed from the oil-free alkyd polymer and relatively longer pendent side chains which are terminated with $\alpha,\beta$-olefinically unsaturated groups, $CH_2=C<$, and attached to the backbone chain, are valuable for preparing a coating composition having excellent coating properties. The prepolymer can be mixed with polyfunctional radical polymerizing compounds and, if necessary, vinyl monomer in the coating composition.

It is an object of the present invention to provide a cross-linkedly hardening polyester resin useful for obtaining a film coating having a superior fixedness, a suitable flexibility and a high weathering resistance.

It is another object of the present invention to provide a method of preparing a cross-linkedly hardening polyester resin useful for obtaining a film coating having a superior fixedness, a suitable flexibility and a high weathering resistance.

The above objects of the present invention are accomplished by preparing a polyester prepolymer comprising a backbone chain formed from a non-crystalline polycondensation product of a polybasic carboxylic acid and a polyol, having a molecular weight of 300 to 5,000 and containing hydroxyl groups with a hydroxyl value of 20 to 200; and at least one pendent side chain containing at least two ester groups and at least one $\alpha,\beta$-olefinically unsaturated terminal group and is attached to the hydroxyl group of the backbone chain in an ester bonding in a proportion of not lower than 0.5 but not exceeding 7.0 of the side chain with respect to 1,000 molecular weight of the backbone polymer.

The polyester prepolymer may be mixed with an organic solvent selected from various solvents in order to prepare a coating composition. Preferably, the polyester prepolymer of the present invention may be dissolved in a radically polymerizing compound in order to obtain a coating composition capable of radiation curing with no evaporation of solvent.

The backbone polyesters usable for the preparation of the polyester prepolymer of the present invention are non-crystalline polyester having a molecular weight of 300 to 5,000 and a hydroxyl value of 20 to 200 mg. KOH/g., and obtained by polycondensing (A) a polybasic carboxylic acid component and (B) a polyol component.

The polybasic carboxylic acid usable for the preparation of the backbone polymer may be selected from various aliphatic polybasic carboxylic acids having a straight or branched chain of 2 to 20 carbon atoms, aromatic polybasic carboxylic acids, alicyclic polybasic carboxylic acids, and aralkyl polybasic carboxylic acids, for example, malonic acid, oxalic acid, succinic acid, maleic acid, succinic anhydride, dodecenyl succinic anhydride, maleic anhydride, glutaric acid, fumaric acid, itaconic acid, $\alpha$-methylene glutaric acid, adipic acid, sebacic acid, phthalic acid, isophthalic acid, tetrabromophthalic acid, tetrahydrophthalic acid, hexahydrophthalic acid, dimethylterephthalic acid, naphthalene dicarboxylic acid, endo-methylene tetrahydrophthalic acid, citraconic acid, muconic acid, diglycollic acid, pimelic acid, maleic acid, p-carboxyphenyl carboxylic acid, benzophenone-4,4'-dicarboxylic acid and dicarboxylic acid of the formula:

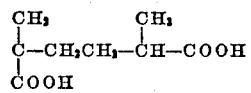

The polyol component preferably contains 10 to 85% by mol of polyhydric alcohol having 3 or more hydroxyl groups in order to form the backbone polymer having hydroxyl groups.

The polyhydric alcohol having at least 3 hydroxyl groups usable for the preparation of the backbone polymer may be selected from glycerol, trimethyol propane, 1,3,6-hexanetriol, trimethylol ethane, pentaerythritol, sorbitol, and glucose. The diols suitable for mixing with the above polyols containing at least 3 hydroxyl groups may be selected from ethylene glycol, propylene glycol, 1,3-butylene glycol, diethylene glycol, 1,4-cyclohexanediol, neopentyl glycol, bis-phenol A, hexamethylene glycol, p-dihydroxydimethyl benzene, hexahydroresorcinol, hydroquinone, and polyalkylene glycols, for example, polyethylene glycol, polypropylene glycols, polytetrahydrofuran, polyethylene oxide, polypropylene oxide, and mixtures of the above diols. If the polyol component contains less than 10% by mol of the polyhydric alcohol containing at least 3 hydroxyl groups, the resultant backbone polymer has an acid value less than 20 and therefore, can not form a prepolymer capable of sufficiently cross-linking. Contrarily, when the content of the polyhydric alcohol containing at least 3 hydroxyl groups is greater than 85% by mol, the resultant backbone polymer has an acid value of 200 or more; it is possible to prepare a prepolymer having a high cross-linking property from the above backbone polymer, but it causes disadvantages. Coatings from such a prepolymer have low flexibility, impact resistance and adhesiveness.

Preferably, the backbone alkyd polymer has a molecular weight of 300 to 5,000. An alkyd polymer having a molecular weight smaller than 300 is unsuitable for the preparation of a prepolymer having a high cross-linking property. The alkyd polymer of a molecular weight larger than 5,000 causes various difficulties during the preparation of the prepolymer.

The polyester prepolymer of the present invention is prepared by means of a process wherein the backbone polymer is dissolved in an organic solvent and subjected to a first reaction with a polybasic carboxylic acid anhydride and then to a second reaction with a vinyl monomer so as to form pendent side chains attached to the backbone polymer. In the first reaction, the backbone polymer which contains the hydoxyl groups is reacted with the polymer which contains the hydroxyl groups is reacted with the polybasic carboxylic acid anhydride in the presence of a catalyst in a proportion of at least 0.1 mol of the polybasic carboxylic acid anhydride with respect to 1.0 mol of the hydroxyl group so as to esterify the hydroxyl group with a carboxyl group derived from the polybasic carboxylic acid anhydride. Through the above first reaction, a first side chain, which is attached to the backbone polymer with an ester bonding and terminated with at least one carboxyl group, is formed.

In the second reaction, the product of the first reaction is reacted with a vinyl monomer both ends of which are terminated with a glycidyl group and an $\alpha,\beta$-olefinically unsaturated group in at least the same proportion by mol of the vinyl monomer as that of the polybasic carboxylic acid anhydride in the first reaction, that is, at least 0.1 mol, with respect to 1.0 mol of the hydroxyl group of the backbone polymer so as to esterify the carboxyl group of the first side chain with the glycidyl group of the vinyl monomer. Through the above second reaction, a second side chain, which contains at least two ester groups and is terminated with the α,β-olefinically unsaturated group, is attached to the backbone polymer in a proportion of not lower than 0.5 but not exceeding 7.0 of the second side chains with respect to 1,000 molecular weight of the backbone polymer.

The resultant side chain from the above and second reactions is, for example, of the following formula:

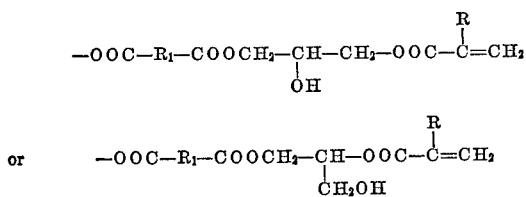

wherein R is the same as defined hereinbefore, and $R_1$ is a di-valent aliphatic, aromatic, alicyclic or aralkyl group, therefore, OOC—$R_1$—COO is a residue of aliphatic, aromatic, alicyclic or aralkyl polybasic carboxylic acid.

The polybasic carboxylic acid anhydride usable for the first esterification of the backbone polymer, may be selected from the anhydrides of maleic acid, chlorinated maleic acid, succinic acid, itaconic acid, α-methylene glutaric acid, citraconic acid, phthalic acid, tetrahydrophthalic acid, hexahydrophthalic acid, tetrabromophthalic acid, hexahydrophthalic acid, tetrabromophthalic acid, naphthalene dicarboxylic acid, dodecylsuccinic acid, endo-methylene tetrahydrophthalic acid, methyl-endo-methylene tetrahydrophthalic acid, 1,4,5,6,7,7-hexachloro-bi-cyclo-[2,2,1]hept-6-en-2,3-dicarboxylic acid. It is necessary that the carboxylic anhydrides as mentioned above is applied in a proportion of at least 0.1 mol of the anhydride with respect to 1 mol of the hydroxyl group of the backbone polymer. When the proportion of the carboxylic anhydride is less than 0.1 mol with respect to 1 mol of the hydroxyl group, the resultant prepolymer is unsatisfactory for formnig a film coating having sufficient cross-linkedly hardening property.

Needless to say it is allowable that the polybasic carboxylic anhydride be applied to the first esterification of the backbone polymer in a proportion of more than 1 mole with respect to 1 mol of the hydroxyl group of the backbone polymer, and it is preferable that the proportion be in the range of 0.1 to 1 mol of the anhydride.

The vinyl monomer useful for the second reaction according to the present invention may be selected from glycidyl esters of α,β-olefinically unsaturated acids and glycidyl ethers of hydroxyl group-containing vinyl monomers, such as glycidyl acrylate ester, glycidyl methacrylate ester, allyl glycidyl ether, methanallyl ether, and vinyl cyclohexane monoxide.

In the process of the preparation of the prepolymer of the present invention, it is remarkable that the first esterification reaction between the hydroxyl groups of the backbone polymer and the carboxylic groups derived from the ployabsic carboxylic acid anhydride is advanced substantially quantitatively at a high reaction velocity, and the second reaction between the carboxylic group of the first side chain and the glycidyl group of the vinyl monomer terminated with the α,β-olefinically unsaturated group is also carried out quantitatively at a high reaction velocity.

The process of the present invention has the great advantages in that the composition of the prepolymer does not gelate during the preparation of the prepolymer whereas the conventional process tends to cause the gelation of the resultant composition, and that owing to the relatively larger length of the side chain containing at least two ester groups and terminating with the α,β-olefinically unsaturated group, no incvonvenience is found even when the backbone polymer includes the considerable mass of a number of the unsaturated groups.

The prepolymers prepared through the process of the present invention are readliy hardened by the radiation curing of active energy rays. In the radiation curing, it is remarkable that the film coating layer of the prepolymer composition can readily relax the sudden shrinkage of the coating layer during the curing by the radiation of the active energy ray. Therefore, the resultant film coatings from the prepolymer composition have a high flexibility and adhesiveness.

In the process of preparing the prepolymer of the present invention, the first and second reaction applied to the backbone polymer can be effected in the absence of catalyst. However, it is desirable that the reactions be carried out in the presence of a basic catalyst in order to complete the reactions at a relatively lower temperature in the shorter time. The basic catalyst may be preferably selected from compounds having a tertiary amino group and a polymerizable unsaturated group, for example, dimethylaminoethyl acrylate ester, dimethylaminoethyl acrylate ester, N-dimethyl acrylamide, N-dimethyl methacrylamide, 2 - vinyl pyridine, 2-methyl-5-vinyl pyridine, 3-ethyl-5-vinyl pyridine, additional product of glycidyl acrylate ester and dimethyl amine.

The basic catalysts as mentioned above, have advantages in that no undesirable side reaction occurs, whereas other basic catalysts tend to cause undesirable side-reactions and in that the basic catalyst is fixed in the resultant film coatings as a constituent, whereas other catalysts which can not be cured in the resultant film coatings as a constituent, have many undesirable influences.

The basic catalyst is preferably used in a content of 1 to 30% based on the weight of the backbone polymer. When the basic catalyst is used in a content less than 1% by weight, the reaction system is insufficiently effected by the catalyst, and when the content of the basic catalyst is greater than 30% by weight, the resultant film coating tends to undesirably color.

The first and second reactions for the backbone polymer having the features as stated above, are preferably carried out in an organic solvent with a content of the backbone polymer of 10 to 80% by weight. The organic solvent usable for the preparation of the prepolymer of the present invention may be selected from the usual organic solvents such as toluene, xylene, methyl ethyl ketone, methyl isobutyl ketone, ethyl acetate, butyl acetate and monoethyl ether of ethylene glycol acetate.

Further, when the resultant prepolymer composition is hardened through, radiation curing by active energy rays such as ultraviolet rays or electron beams, it is preferable that one or more radically polymerizing-liquid compound is used as a solvent for the prepolymer instead of the solvent mentioned above. Such a radically polymerizing liquid compound may be selected from esters which are obtained by esterifying an α,β-olefinically unsaturated carboxylic acid with a monohydric alcohol, for example, methyl acrylate, methyl methacrylate, propyl acrylate, propyl methacrylate, 2-chloroethyl acrylate, 2-chloroethyl methacrylate, isopropyl acrylate, isopropyl methacrylate, butyl acrylate, butyl methacrylate, 2-ethyl hexyl acrylate, 2-ethyl hexyl methacrylate, benzyl acrylate, benzyl methacrylate, cyclohexyl acrylate, cyclohexyl methacrylate, phenethyl acrylates, and phenethyl methacrylates; acrylic acid; methacrylic acid; itaconic acid; and diester of the formula:

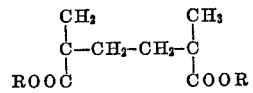

wherein R is H or $CH_3$; aromatic vinyl compounds such as styrene, p-bromostyrene and vinyl toluene; monoethylenically unsaturated nitriles such as acrylonitrile, methacrylonitrile and α-methylene glutaronitrile; vinyl esters of organic acids such as vinyl acetate, vinyl propionate, vinyl versatic acid, the versatic acid refers to an aliphatic monocarboxylic acid containing an alkyl group of 9 to 11 carbon atoms, and amides such as acryl amide, methacryl amide, N-alkoxyalkylacrylamides, N-alkoxyalkylmethacrylamides, diacetone and acrylamide and diacetone methacrylamide.

When the above-mentioned radically polymerizing compounds are utilized as the solvent for the prepolymer it is preferable that the acrylate or methacrylate monomers are contained at a content of at least 30% by weight in the prepolymer composition. If the content of the acrylate or methacrylate monomers is less than 30% sometimes, the resulting film coating has insufficient desirable properties.

It is a remarkable characteristic of the present invention that the prepolymer compositions of the present invention may further contain 2 to 80% by weight of radically polymerizing oligomer including at least two ester groups and terminated with at least two olefinically unsaturated groups.

The oligomers as stated above, include the compounds (1) to (6) as indicated hereunder.

(1) Oligomer (1) which is obtained by reacting a vinyl monomer terminated with hydroxyl group with a polybasic carboxylic anhydride and then further reacting the product with a vinyl monomer terminated with a glycidyl group.

(2) Oligomer (2) which is obtained by reacting a vinyl monomer terminated with a hydroxyl group with a polybasic carboxylic anhydride and then further reacting the product with a polyepoxy compound, preferably having an epoxy equivalent of 100 to 2,000.

(3) Oligomer (3) which is obtained by reacting a polyhydric alcohol with a polybasic carboxylic anhydride and then further reacting the product with a vinyl monomer-terminated with a glycidyl group.

(4) Oligomer (4) which is obtained by reacting an $\alpha,\beta$-ethylenically unsaturated carboxylic acid with a vinyl monomer terminated with a glycidyl group.

(5) Oligomer (5) which is obtained by reacting a polybasic carboxylic acid with a vinyl monomer terminated with a glycidyl group.

(6) Oligomer (6) which is obtained by reacting a hydroxyalkyl ester of an $\alpha,\beta$-ethylenically unsaturated carboxylic acid with a polybasic carboxylic anhydride and further condensing the result with a polyhydric alcohol; or by reacting a polyhydric alcohol with a polybasic carboxylic anhydride and then further condensing the result with an $\alpha,\beta$-ethylenically unsaturated carboxylic acid.

The above-mentioned oligomers may be prepared separately from the preparation of the prepolymer and then added into the prepolymer composition as a solvent for the prepolymer. Also, the oligomer may be prepared simultaneously with the preparation of the prepolymer wherein the backbone polymer is esterified with a polybasic carboxylic anhydride and then the resultant side chain of the backbone polymer is terminated with the $\alpha,\beta$-olefinically unsaturated group.

The vinyl monomer having a hydroxyl group usable for the preparation of the oligomer (1), (2) and (6) may be selected from (a) the compounds of the formula:

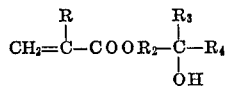

wherein R is as defined hereinbefore, $R_3$ and $R_4$ are hydrogen atoms or $CH_3$, respectively, and $R_2$ is selected from the groups of the formula:

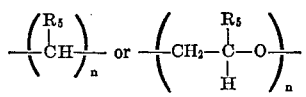

wherein $R_5$ is H or $CH_3$ and $n$ is an integer of 1 to 10, for example, 2-hydroxyethyl, 2-hydroxypropyl, 4-hydroxybutyl and 6-hydroxyhexyl acrylates and methacrylates and polyethylene glycol residue-containing hydroxyalkyl acrylates and mehacrylates; (b) the compounds of the formula:

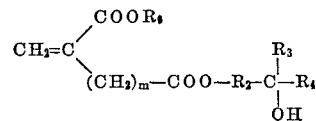

wherein $R_2$, $R_3$ and $R_4$ are the same as defined above, $R_6$ is H or an alkyl group of 1 to 12 carbon atoms, and $m$ is an integer of 1 or 2, for example, mono-(2-hydroxyethyl) itaconate ester, methyl-(2-hydroxyethyl) itaconate ester, methyl-(2-hydroxyethyl) $\alpha$-methylene glutarate ester and ethyl-(2-hydroxyhexyl) $\alpha$-methylene glutarate ester; (c) the compounds of the formula:

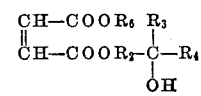

wherein $R_2$, $R_3$, $R_4$ and $R_6$ are the same as defined above, for example mono-(2-hydroxyethyl) maleate ester methyl-(2-hydroxypropyl) maleate ester and butyl-(2-hydroxyethyl) maleate ester; (d) hydroxyethyl acrylamide and methacrylamide; (e) allylalcohol; and (f) methallyl alcohol.

The polybasic carboxylic anhydride usable for the preparation of the oligomers (1) to (3) and (6) may be selected from the above-mentioned carboxylic anhydrides usable for esterification of the backbone polymer, and condensation products of polyol and polybasic carboxylic anhydride in a ratio by mole of 1 or more of the polyhydric alcohol with respect to 2 of the polybasic carboxylic anhydride.

The vinyl monomer having a glycidyl group usable for the preparation of the oligomers (1) and (3) to (5) may be selected from the above-mentioned glycidyl vinyl monomers usable for the preparation of the prepolymer.

The polyepoxy compound usable for the preparation of the oligomer (2) may be selected from the polyepoxides having an epoxy equivalent to 100 to 2,000 such as glycidyl ethers of polyols, for example, diethylene glycol glycidyl ether, dipropylene glycol glycidy ether, polypropylene glycol glycidyl ether, glycerol triglycidyl ether, resorcinol diglycidyl ether, 4,4'-isopropyridene diphenyl glycidyl ether, a condensation product of 4,4'-methylene diphenyl and epichlorohydrin butanediol glycidyl ether, neopentyl glycol glycidyl ether; and glycidyl esters of polybasic carboxylic acids, for example, diglycidyl succinate ester, diglycidyl adipate ester, and diglycidyl phthalate ester; epoxidized novolak resins; epoxidized oils; epoxidized polybutadiene; and triglycidyl isocyanate.

The polyhydric alcohol and the polybasic carboxylic acids usable for the preparation of the oligomers (3) and (5) may be selected from the aforementioned compounds usable for the preparation of the backbone polymer.

The aforementioned oligomers (1) to (6) have a chemically characteristic structure which is very active to radioactive rays and ultraviolet rays and results in an excellent radiation curing property. Accordingly, the coating composition mainly containing the oligomers mentioned above and the prepolymer has a high gelation effect when the composition is cured by way of the radiation of active energy, and the features of the composition results in a superiors cross-linking property during curing.

Further, since the oligomers have a longer chain length than that of the usual vinyl monomers, the shrinking phenomenon of the film coating of the prepolymer composition containing the oligomer during the radiation curing is readily relaxed. Therefore, the cured film coating of the prepolymer composition containing the oligomer has scarcely any inner stress. The excellent flexibility and impact resistance of the cured film coating is derived from the foregoing feature.

As clearly understood from the aforementioned description, most of the oligomers can be prepared from the compounds usable for the preparation of the prepolymer from the backbone polymer. Accordingly, it is advantageous that the preparation of the oligomers be carried out simultaneously with the preparation of the prepolymer.

When the oligomers are utilized as a solvent for the prepolymer, the components of the coating composition, mainly the prepolymer and the oligomer, are entirely cured into one body with no evaporation of solvent. Therefore, the prepolymer compositions as mentioned above cause no disadvantage to human health and result in a coating having coating properties similar to those of a conventional coating composition containing no polymerizing solvent.

In the case where electron beam radiation is utilized for the curing, hardening of the prepolymer composition is effected by application of the electron beam radiation by using an electron beam accelerator of an accelerating voltage of 0.1 to 2.0 kev. with a dose of 0.1 to 2.0 mrad./sec.

In the case where light is used for the curing, the prepolymer composition is hardened by radiation of light of a wave length of 2,000 to 8,000 A. in the presence of a photopolymerization initiator which may be selected, for example, from azo compounds, thiuram compounds, peroxides and carbonyl compounds. Particularly, a photopolymerization initiator useful for the above purpose is benzoin, benzoin alkyl ethers or anthraquinone or its derivative.

The prepolymer composition according to the present invention may be utilized as a clear paint containing no coloring material, or as an enamel paint containing coloring material such as dyes, pigments or metallic powders.

The substrate article for the prepolymer composition according to the present invention may be selected from metal, concrete, asbestos, grass, paper, plastics, synthetic and natural fibers, soft and hard fibrous boards and the like.

The following examples are given by way of illustration of the present invention in detail only.

EXAMPLE 1

Preparation of backbone polymer I

A flask provided with a stirrer, thermometer, condenser and conduit for flowing nitrogen gas thereinto was charged with 1 mol of phthalic anhydride, 1 mol of adipic acid, 0.4 mol of trimethyol propane, 0.7 mol of triethylene glycol and 15 ml. of xylene. The system was heated to a temperature of 190 to 195° C. for 5 hours with stirring while flowing the nitrogen gas therethrough and refluxing the evaporated xylene. Through the above reaction, the componental compounds were condensed into a polyester and the water derived from the condensation was distilled out of the system. The resultant polyester resin was a colorless, transparent, and viscous liquid and had a molecular weight of 2,900, acid value of 36 mg. KOH/g. and hydroxyl value of 120 mg. KOH/g.

EXAMPLE 2

Preparation of backbone polymer II

The flask as used in Example 1 was charged with 1.2 mol of tetrahydrophthalic anhydride, 0.8 mol of sebacic acid, 1 mol of glycerol and 1 mol of 1,4-butanediol. The system was subjected to a condensation reaction at a temperature of 190° C. for 6 hours with stirring while flowing nitrogen gas therethrough. Through the procedure, a backbone polyester II having a molecular weight of 4,000, acid value of 32 mg KOH/g. and hydroxyl value of 95 mg. KOH/g. was obtained.

EXAMPLE 3

Preparation of backbone polymer III

The flask, as used in Example 1, was charged with 1.25 mol of tetrahydrophthalic acid, 0.75 mol of sebacic acid, 0.5 mol of trimethylol propane, 1.5 mol of neopentyl glycol and 20 ml. of xylene. The system was subjected to a condensation reaction at a temperature of 190° C. for 7 hours. The reaction resulted in a backbone polyester III having a molecular weight of 3,700 acid value of 23 mg. KOH/g., and hydroxyl value of 60 mg. KOH/g.

EXAMPLE 4

Preparation of backbone polymer IV

The same procedure as that of Example 2 was repeated using 1.20 ml. of phthalic anhydride, 0.35 mol of maleic acid, 0.10 mol of naphthyl-$\alpha,\beta$-carboxymethyl amine, 1.35 mol of triethylene glycol and 0.65 mol of glycerol at a temperature 185° C. for 8 hours. The procedure resulted in a backbone polyester IV having a molecular weight of 3,000, acid value of 25 mg. KOH/g. and hydroxyl value of 70 mg. KOH/g.

EXAMPLE 5

Preparation of backbone polymer V

The same procedure as that of Example 4 was repeated using 0.6 mol of adipic acid, 0.4 mol of phthalic anhydride, 0.5 mol of trimethylol propane and 0.6 mol of ethylene glycol. The reaction resulted in a backbone polyester V having a molecular weight of 1,200, acid value of 20 mg. KOH/g., and hydroxyl value of 173 mg. KOH/g.

EXAMPLE 6

100 parts of the backbone polyester I prepared in Example 1 were dissolved in a solvent mixture of 50 parts of methyl methacrylate, 50 parts of 2-ethylhexyl acrylate and 0.02 parts of hydroquinone monomethyl ether. Into the solution, 21 parts of maleic anhydride and 5 parts of dimethyl aminoethyl methacrylate were added and then the system was subjected to an esterification of the hydroxyl groups of the backbone polymer I at a temperature of 80° C. for 3 hours so as to form pendent side chains containing an ester group. It was recognized by an infrared analysis that the hydroxyl groups in the backbone polymer I were substantially esterified with the maleic anhydride.

Into the system was further added with 40 parts of glycidyl methacrylate ester and 3 parts of dimethylaminoethyl methacrylate and the mixture was heated at 90° C. for 5 hours. It was recognized through an infrared analysis that the pendent side chains of the resultant polyester were terminated with $\alpha,\beta$-olefinical unsaturated groups derived from the glycidyl methacrylate in a proportion of about 5.2 of the unsaturated terminal groups with respect to 1,000 molecular weight of the backbone polymer.

The polymeric resin solution obtained above was coated on a printed hard board with a thickness of 100 μm., and radiated with electron rays in a nitrogen atmosphere under a radiation condition wherein accelerating voltage was 300 kw., electron current density 20 ma. and dose rate 3 mrad./sec. The resultant film coating on the board was completely cured at a dosage of 8 mrad. The film coating had a high gloss and hardness and excellent resistances against organic solvent, boiling water and weathering.

EXAMPLE 7

100 parts of the backbone polymer II prepared in Example 2 were dissolved in a mixture solvent consisting of 60 parts of n-butyl acrylate, 20 parts of styrene, 30 parts of vinyl propionic acid, 7 parts of 2-methyl-5-vinyl-pyridine, and 0.03 parts of hydroquinone monomethyl ether. The solution was added to 25 parts of phthalic anhydride and heated at a temperature of 90° C. for 2 hours for the esterification of the hydroxyl groups of the backbone polymer II with the phthalic anhydride, at a temperature of 90° C. for 2 hours. It was recognized in the infrared ray analysis that about 95% of the hydroxyl groups of the backbone polymer II was esterified with the phthalic anhydride so as to form a pendent side chain containing the ester group.

The system was mixed with 30 parts of glycidyl acrylate and 5 parts of 2-methyl-5-vinyl-pyridine and heated at a temperature of 90° C. for 4 hours so as to react the carboxyl residue of the pendent side chain derived from the phthalic acid with the glycidyl group of the glycidyl acrylate. Through the reaction, the ester group-containing pendent side chains were substantially terminated with α,β-olefinically unsaturated group derived from the glycidyl acrylate.

By the infrared analysis, it was recognized that the resultant prepolymer contained the pendent side chains terminated with the α,β-olefinical unsaturated groups in a proportion of about 2.0 of the unsaturated terminal group with respect to 1,000 molecular weight of the backbone polymer.

100 parts of the prepolymer solution obtained above were mixed with 25 parts of titanium oxide and 5 parts of phthalocyanine blue so as to prepare an enamel paint. The enamel paint was coated on a burnished mild steel plate with a film thickness of 30 μm. and then cured by the radiation of the electron rays with a total dosage of 6 mrad. The resultant film coating had an excellent gloss, flexibility, adherent property and resistance against corrosion.

EXAMPLE 8

100 parts of the backbone polymer III prepared in Example 3 were dissolved into a mixture solvent consisting of 50 parts of 2-ethylhexyl acrylate, 50 parts of benzyl methacrylate, 5 parts of dimethylaminoethyl methacrylate and 0.05 parts of hydroquinone monomethyl ether. The solution was added to 12 parts of succinic anhydride and then heated at a temperature of 90° C. for 3 hours so as to form side chains attached to the backbone polymer III and containing ester groups. Through the procedure, substantially all of the hydroxyl groups of the backbone polymer III were esterified with the succinic anhydride. The ester groups of the side chain were recognized in the infrared analysis. The system was further added to 20 parts of glycidyl acrylate and heated at a temperature of 90° C. for 4 hours. Through the procedure, the carboxyl residues derived from the attached succinic acid, were substantially reacted with the glycidyl group of the glycidyl acrylate so as to terminate the side chains with the α,β-olefinically unsaturated groups.

By infrared analysis, it was recognized that the resultant prepolymer contained the pendent side chains terminated with the α,β-olefinical unsaturated groups in a proportion of about 1.5 of the unsaturated terminal groups with respect to 1,000 molecular weight of the backbone polymer.

100 parts of the above prepolymer soultion were mixed with 2 parts of benzoin isopropyl ether and the mixture was coated on a hard board printed with a wood grain-like pattern with a thickness of 100μ m. The film coating was cured by ultraviolet ray radiation of a main wave length of 3,600 A. at a location below the ultraviolet ray lamp which had a length of 50 cm. and an output of 20 w., for 10 minutes in a nitrogen atmosphere. By this radiation, the film coating was perfectly hardened, whereby a printed hard board provided with superior properties was obtained.

EXAMPLE 9

100 parts of the backbone polymer IV described in Example 4 were dissolved in a mixed solvent consisting of 50 parts of isobutyl methacrylate, 50 parts of p-chlorostyrene, 70 parts of 2-ethylhexyl acrylate and 0.03 parts of hydroquinone monomethyl ether. The solution was added to 14 parts of itaconic anhydride.

The system was heated at a temperature of 90° C. for 3 hours in order to esterify the pendent hydroxyl groups of the backbone polymer IV with the itaconic anhydride.

The system was mixed with 20 parts of allyl glycidyl ether and then heated at a temperature of 90° C. for 4 hours so as to react the carboxyl residues of the itaconic acid attached to the pendent side chains with the glycidyl group of the allyl glycidyl ether. Through the above-reaction, the pendent side chains of the resultant prepolymer were terminated with α,β-olefinical unsaturated groups derived from the allyl glycidyl ether in a proportion of about 1.4 of the unsaturated terminal groups with respect to 1,000 molecular weight of the backbone polymer.

100 parts of the resultant prepolymer solution were mixed with 100 parts of a rutile-type titanium oxide so as to prepare an enamel paint. The enamel paint was coated on a plate prepared from ABS resin [poly(acrylonitrile-butadiene-styrene)] with a film thickness of 50 μm. The film coating was cured in the same manner as that of Example 6 with a total dosage of 10 mrad. of electron rays.

The resultant film coating had an excellent adherent property and a superior resistances against organic solvent, chemicals and weathering.

EXAMPLE 10

The procedure of Example 6 was repeated using 100 parts of xylene and 100 parts of ethyl acetate instead of methyl methacrylate and 2-ethyl hexyl acrylate. 100 parts of the resultant prepolyester solution were mixed with 2 parts of desyl chloride so as to prepare a coating composition. The coating composition was sprayed onto an aluminium plate and then dried by blowing hot air of 50° C. thereon so as to form a film coating of a thickness of 20 μm. on the plate. The dried film coating was cured by the radiation of the ultraviolet ray in the same manner as that of Example 8. The resultant film coating had a superior resistance to organic solvent and a high adherent property to the aluminium plate.

EXAMPLE 11

100 parts of the backbone polymer V as prepared in Example 5 were dissolved into a mixture solvent consisting of 100 parts of n-butyl acrylate and 20 parts of styrene. The solution was added to 31 parts of succinic anhydride, 5 parts of triethyl amine and 0.03 parts of hydroquinone monomethyl ether and heated at a temperature of 90° C. for 5 hours in order to esterify the hydroxyl groups of the backbone polymer V with the succinic anhydride. Next, the system was added to 50 parts of glycidyl acrylate ester and heated to a temperature 90° C. for 3 hours in order to terminate the side chain with the α,β-olefinically unsaturated group in a proportion of about 3.7 of the unsaturated terminal groups with respect to 1,000 molecular weight of the backbone polymer.

An enamel paint was prepared from the prepolymer solution as prepared above in the same manner as that of Example 7.

The paint was applied onto a chemically treated iron plate with a film thickness of 30 μm. and the film coating was cured in the similar manner to that of Example 6 with a total dosage of 6 mrad. of electron rays. The resultant coating had a high gloss, flexibility, adherent property and a superior resistance against corrosion.

EXAMPLE 12

100 parts of the backbone polymer I were dissolved into a mixture solvent consisting of 50 parts of cyclohexyl methacrylate, 80 parts of 2-ethylhexyl acrylate, and 0.05 parts of hydroquinone monomethyl ether, and 21 parts of maleic anhydride was added into the solution. The system was heated at a temperature for 1 hour in order to esterify the pendent hydroxyl groups of the backbone polymer I with the maleic anhydride. 75 parts of glycidyl methacrylate were added into the system and the system was heated at a temperature of 90° C. for 5 hours in order to terminate the pendent groups with the α,β-olefinically unsaturated group derived from the glycidyl acrylate.

The resultant composition was composed of a prepolymer having a pendent side chain group of the formula:

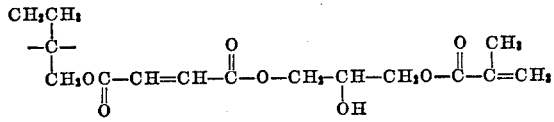

in a proportion of about 5.2 of the side chain group with respect to 1,000 molecular weight of the backbone polymer; an oligomer of the formula:

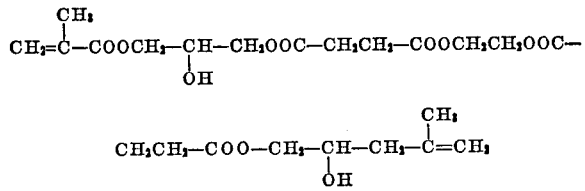

and the solvent containing the vinyl monomers.

The composition was applied onto a steel plate with a thickness of 50 μm. and cured in the same manner as that of Example 6 with a total dosage of 3 mrad. of electron rays. The cured film coating had a high impact resistance.

EXAMPLE 13

The esterification for 100 parts of the backbone polymer I was repeated in the same procedure as that of Example 12 except that 31 parts of acrylic acid were used instead of maleic anhydride. The resultant polymer-containing system was mixed with 101 parts of glycidyl methacrylate and then heated at a temperature of 90° C. for 6 hours.

Through the above procedure, the resultant composition solution was composed of the same prepolymer as obtained in Example 11, an oligomer of the formula:

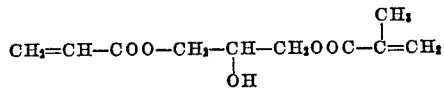

and the solvent containing the vinyl monomer.

The coating procedure of Example 6 was repeated using the above solution. The coating was completely cured with a total dosage of 2.5 mrad. of electron ray.

EXAMPLE 14

Preparations of oligomers A to L capable of radical polymerization

Oligomer A: A mixture of 130 parts of 2-hydroxyethyl methacrylate, 100 parts of succinic anhydride, 10 parts of dimethylaminoethyl methacrylate and 0.1 parts of hydroquinone monomethyl ether was subjected to reaction at a temperature of 90° C. for 2 hours. Next, 142 parts of glycidyl methacrylate were added into the system and the system was heated at a temperature of 95° C. for 5 hours. The resultant oligomer mainly had the formula:

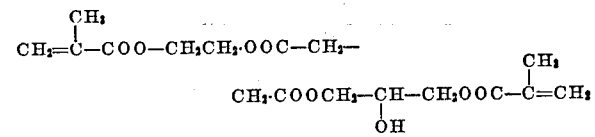

Oligomer B: The flask as used in Example 1 was charged with 116 parts of 2-hydroxyethyl acrylate, 100 parts of succinic anhydride and 0.5 parts of hydroquinone monomethyl ether. The system was heated at a temperature 130° C. for 20 minutes while sweeping nitrogen gas therethrough. Next, the system was added to 97 parts of bis-phenol A, 400 parts of toluene, and 3 parts of p-toluene sulfonic acid and then heated at a refluxing temperature for 4 hours while distilling off water generated with the reaction was completed, the system was neutralized with sodium bicarbonate, and the produced sodium p-toluene sulfonate was eliminated by filtration. After distillation of toluene, the oligomer mainly having the formula:

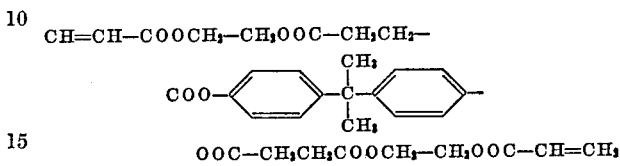

was obtained.

Oligomer C: In accordance with the same procedure as that of oligomer B, 130 parts of 2-hydroxyethyl methacrylate reacted with 100 parts of succinic acid and the resultant system was treated together with 130 parts of 2-hydroxyethyl methacrylate, 300 parts of toluene and 2 parts of p-toluene sulfonic acid. The resultant oligomer mainly had the formula

Oligomer D: The procedure for the preparation of oligomer B was repeated using a reaction of 95 parts of maleic anhydride and 130 parts of 2-hydroxyethyl methacrylate and an addition consisting of 38 parts of 1,3-butylene glycol, 400 parts of toluene and 3 parts of p-toluene sulfonic acid. The resultant oligomer D mainly had the formula:

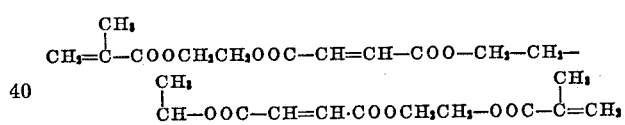

Oligomer E: The procedure for the preparation of Oligomer B was repeated using a reaction mixture of 111 parts of 2-hydroxyethyl acrylate and 100 parts of succinic anhydride and an addition consisting of 31 parts of ethylene glycol, 400 parts of toluene and 3 parts of p-toluene sulfonic acid. The resultant oligomer E mainly had the formula:

$$CH_2=CH-COOCH_2CH_2OOCH_2CH_2COOCH_2CH_2$$
$$OOCCH_2CH_2COO-CH_2CH_2OOC-CH=CH_2$$

Oligomer F: The procedure for the preparation of oligomer E was repeated using 200 parts of polyethylene glycol of a molecular weight of 400 instead of the ethylene glycol. The resultant oligomer F mainly had the formula:

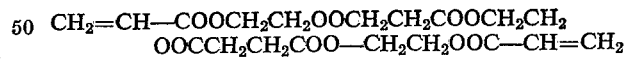

Oligomer G: 24 parts of ethylene glycol, 41 parts of phthalic acid and 36 parts of adipic acid were reacted at a temperature of 180° C. for 6 hours so as to prepare a primary polyester oligomer having a degree of condensation of approximately 6 and terminated with a carboxyl group. The primary oligomer containing system was mixed with 100 parts of toluene, 1 part of p-toluene sulfonic acid, 0.2 parts of hydroquinone monomethyl ether and 30 parts of 2-hydroxypropyl acrylate and heated in the same manner as that of oligomer A. The resultant secondary polyester oligomer was terminated with a vinyl group.

Oligomer H: A mixture consisting of 108 parts neophentyl glycol, 186 parts of maleic anhydride, 3 parts of dimethylaminoethyl methacrylate and 0.1 parts of hydroquinone monomethyl ether was heated at a temperature of 120° C. for 2 hours. Next, the mixture was further mixed with 298 parts of glycidyl methacrylate, 1 part of dimethylaminoethyl methacrylate and 0.1 parts of hydroquinone monomethyl ether and heated at a temperature of 100° C. for 5 hours. The resultant oligomer had the formula:

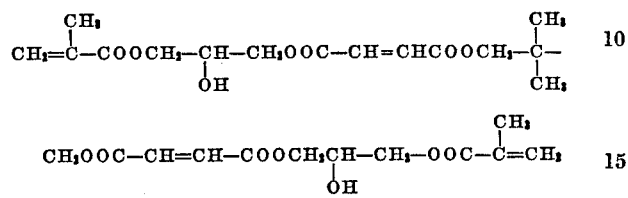

Oligomer I: 75 parts of adipic acid were subjected to the reaction with 124 parts of glycidyl acrylate ester in the presence of 5 parts of dimethylaminoethyl methacrylate and 0.1 parts of hydroquinone monomethyl ether at a temperature of 90° C. for 5 hours. The result was an oligomer of the formula

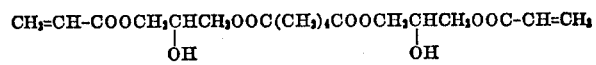

Oligomer J: 100 parts of the oligomer I were dissolved in 200 parts of toluene and mixed with 63 parts of acrylic anhydride. The mixture was subjected to reaction at a temperature of 100° C. for 1 hour. The by-product acrylic acid and the toluene were distilled off. Through the reaction, the hydroxyl group of the oligomer I was esterified with the acrylic acid so as to result in oligomer J of the formula:

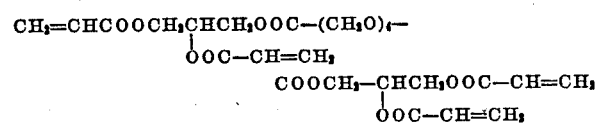

Oligomer K: A solution of 100 parts of the oligomer I in 200 parts of toluene was mixed with 49 parts of butyl isocyanate and the solution mixture was heated at a temperature of 60° C. for 5 hours. The toluene in the mixture was distilled off thereafter. Through this procedure, the hydroxyl groups of oligomer I were urethanated with the butyl isocyanate as indicated below.

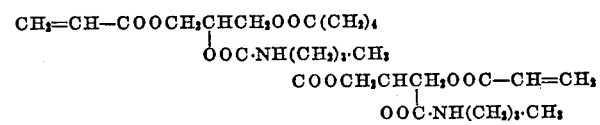

Oligomer L: 130 parts of 2-hydroxyethyl methacrylate were reacted with 100 parts of succinic anhydride in the presence of 2 parts of dimethylaminoethyl methacrylate and 0.3 parts of hydroquinone monomethyl ether at a temperature of 95° C. for 1 hour. The reaction mixture was further mixed with 180 parts of Epikote 828, which is a trade name of a condensate product of epichlorohydrin and diphenyl propane of an epoxy-equivalent of 182–194 made by Shell International Chemical Corp., Great Britain, and then heated at a temperature of 95° C. for 6 hours so as to obtain the oligomer L.

EXAMPLE 15

Six prepolymer compositions were prepared by mixing 60 parts of the resultant composition of Example 6 with 40 parts of the oligomer A, B, C, D, E, or F. The mixture compositions were applied onto printed hard boards with a film thickness of 100 μm., and the resultant film coatings were cured in the same manner as that of Example 6 respectively. The curings of the film coatings were completed with the total dosage of electron rays illustrated in Table 1, and the cured film coatings had the pencil hardness shown in Table 1 and the insolubility of 100% in usual organic solvent, respectively.

TABLE 1

| Oligomer | Total dosage, Mrad. | Pencil hardness |
| --- | --- | --- |
| A | 2 | 3H |
| B | 5 | 2H |
| C | 2.5 | 3H |
| D | 3 | 2-3H |
| E | 4 | H-2H |
| F | 5 | H |

The coated decorative hard boards had high gloss and superior resistance against organic solvent, boiling water and weathering.

EXAMPLE 16

Three mixture compositions were prepared by mixing 40 parts of the resultant composition of Example 7 with 10 parts of the oligomer I, J or K. 100 parts of the mixture compositions were further mixed with 25 parts of titanium dioxide and 5 parts of phthalocyanine blue so as to prepare enamel paints, respectively. The enamel paints were applied onto zinc-plated iron plates treated with zinc phosphate and having a thickness of 0.278 mm., with a film thickness of 20 μm., and the film coatings were cured in the same method as of Example 6 with the total dosage of electron rays being as indicated in Table 2, respectively. The results had properties illustrated in Table 2, and high weathering resistances.

TABLE 2

| Oligomer | Total dosage in Mrad. for the completion of curing | Pencil hardness | Impact resistance in cm.[1] |
| --- | --- | --- | --- |
| I | 3 | 2H | 50 |
| J | 2 | 3H | 25 |
| K | 4 | F-H | <50 |

[1] The impact resistance was determined in accordance with the Du Pont method wherein an iron rod, which is provided with a half ball of ½ inch diameter at the lower end thereof and has a weight of 1 kg., is allowed to fall down onto the film coating on the plate, the impact resistance is expressed in upper limit value of falling distance in cm. of the iron rod under which limit the film coating is not broken.

EXAMPLE 17

Three coating compositions were prepared by mixing 70 parts of the resultant prepolymer solution of Example 8 with 30 parts of the oligomer G, H or L. The coating compositions were further mixed with 2 parts of benzoin isopropyl ether and applied onto hard boards printed with a wood grain-like pattern, with a film coating thickness of 100 μm. The film coatings were completely cured by the radiation of ultraviolet rays in the same manner as that of Example 8 in the time illustrated in Table 3. The cured film coatings had pencil hardnesses as indicated in Table 3 and high fixedness to the board, respectively.

TABLE 3

| Oligomer | Radiation time, minutes | Pencil hardness |
| --- | --- | --- |
| G | 8 | H-2H |
| H | 5 | 2H |
| L | 7 | H-2H |

What we claim is:
1. A cross-linkedly hardening polyester prepolymer comprising a backbone chain formed from a noncrystal- line polyester of a molecular weight of 300 to 5,000 which is a polycondensation product of a polybasic carboxylic acid component and a polyol component and contains hydroxyl groups with a hydroxyl value of 20 to 200 mg. KOH/g., and at least one pendent side chain substituting said hydroxyl groups of said backbone chain with an ester bonding in a proportion of not lower than 0.5 but not exceeding 7.0 of said pendent side chains with respect to 1,000 molecular weight of said backbone chain, said pendent side chain containing at least two ester groups and being terminated with at least one $\alpha,\beta$-olefinically unsaturated group.

2. A polyester prepolymer as set forth in claim 1 wherein said polybasic carboxylic acid component of said backbone chain is a member selected from aliphatic polybasic carboxylic acids having a straight or branched chain of 2 to 20 carbon atoms, aromatic polybasic carboxylic acids, alicyclic polybasic carboxylic acids and aralkyl polybasic carboxylic acids.

3. A polyester prepolymer as set forth in claim 1, wherein said polybasic acid component of said backbone chain is a member selected from the class consisting of malonic acid, oxalic acid, succinic acid, maleic acid, glutaric acid, fumaric acid, itaconic acid, $\alpha$-methylene glutaric acid, adipic acid, sebacic acid, phthalic acid, isophthalic acid, tetrabromophthalic acid, tetrahydrophthalic acid, dimethyl tetraphthalic acid, naphthalene dicarboxylic acid, endomethylene tetrahydrophthalic acid, naphthalene dicarboxylic acid, endomethylene tetrahydrophthalic acid, citraconic acid, muconic acid, diglycollic acid, pimelic acid, malic acid, p-carboxyphenyl carboxylic acid, benzophenone-4,4'-dicarboxylic acid, and dicarboxylic acid of the formula:

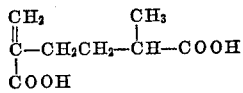

4. A polyester prepolymer as set forth in claim 1, wherein said polyol component of said backbone chain is a polyol mixture containing 1 to 85 mol percent of alcohol containing at least three hydroxyl groups.

5. A polyester prepolymer as set forth in claim 4, wherein said alcohol containing at least three hydroxyl groups is a member selected from the group consisting of glycerol, trimethylol propane, 1,3,6-glucose and mixtures thereof.

6. A polyester prepolymer as set forth in claim 4, wherein said polyol mixture contains a diol selected from the group consisting of ethylene glycol, propylene glycol, 1,3-butylene glycol, diethyl glycol, 1,4-cyclohexane diol, neopentyl glycol, bis-phenol A, hexamethylene glycol, p-dihydroxy dimethyl benzene, hexahydroresorcinol, hydroquinone, polyalkylene glycols and mixtures thereof.

7. A polyester prepolymer as set forth in claim 1, wherein said pendent side chain is of the formula:

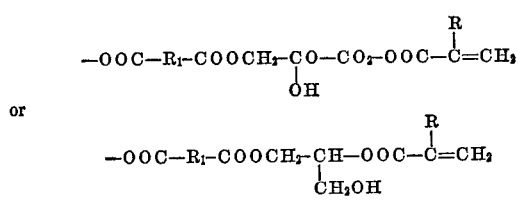

wherein R represents a hydrogen atom or methyl group, and $R_1$ represents a di-valent organic group, therefore, OOC—$R_1$—COO represents a polybasic carboxylic acid residue.

8. A polyester prepolymer as set forth in claim 1, wherein pendent side chain is attached to said backbone chain with a residue of a polybasic carboxylic acid selected from the class consisting of maleic acid, chlorinated maleic acid, succinic acid, itaconic acid, $\alpha$-methylene glutaric acid, citraconic acid, phthalic acid, tetrahydrophthalic acid, hexahydrophthalic acid, tetrabromophthalic acid, naphthalene dicarboxylic acid, dodecenyl succinic acid, endo-methylene tetrahydrophthalic acid, methyl-endo-methylene tetrahydrophthalic acid, hexahydrophthalic acid, and 1,4,5,6,7,7-hexachloro-bi-cyclo[2,2,1]hept-6-en-2,3-dicarboxylic acid.

9. A polyester prepolymer as set forth in claim 1, wherein said pendent side chain is terminated with a residue of a member selected from glycidyl esters of $\alpha,\beta$-olefinically unsaturated acids and glycidyl ethers of hydroxyl group-containing vinyl monomers.

10. A polyester prepolymer as set forth in claim 9, wherein said glycidyl ester is glycidyl acrylate ester or glycidyl methacrylate ester.

11. A polyester prepolymer as set forth in claim 9, wherein said glycidyl ether is allyl glycidyl ether, methallyl glycidyl ether or vinyl cyclohexane monoxide.

12. A method of preparing a cross-linkedly hardening polyester prepolymer comprising the steps of
(1) first reacting a backbone polymer of a molecular weight of 300 to 5,000 which is a polycondensation product of a polybasic carboxylic acid component and a polyol component and contains hydroxyl groups with a hydroxyl value of 20 to 200 mg. KOH/g., with a polybasic carboxylic acid anhydride in a proportion of at least 0.1 mol of said polybasic carboxylic acid anhydride with respect to 1.0 mol of said hydroxyl groups in said backbone polymer, and
(2) then reacting the product resulting from said step (1) with a vinyl monomer terminated at the ends thereof with a glycidyl group and an $\alpha,\beta$-olefinically unsaturated group in a proportion of at least 0.1 mol of said vinyl monomer with respect to 1.0 mol of said hydroxyl group of said backbone polymer.

13. A method as set forth in claim 12, wherein said polybasic carboxylic acid component for said backbone polymer is selected from aliphatic polybasic carboxylic acids having a straight or branched chain of 2 to 20 carbon atoms, aromatic polybasic carboxylic acids, alicyclic polybasic carboxylic acids and aralkyl polybasic carboxylic acids.

14. A method as set forth in claim 12, wherein said polybasic acid component for said backbone polymer is a member selected from the class consisting of malonic acid, oxalic acid, succinic acid, maleic acid, succinic acid anhydride, dodecenyl succinic acid anhydride, maleic acid anhydride, glutaric acid, fumaric acid, itaconic acid, $\alpha$-methylene glutaric acid, adipic acid, sebacic acid, phthalic acid, isophthalic acid, tetrabromophthalic acid, tetrahydrophthalic acid, hexahydrophthalic acid, dimethyl tetraphthalic acid, naphthalene dicarboxylic acid, endo-methylene tetrahydrophthalic acid, citraconic acid, muconic acid, diglycollic acid, pimelic acid, malic acid, p-carboxyphenyl carboxylic acid, benzophenone 4,4'-dicarboxylic acid and dicarboxylic acid of the formula:

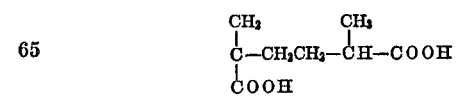

15. A method as set forth in claim 12, wherein said polyol component for said backbone polymer is a polyol mixture containing 10 to 85 mol percent of alcohol containing at least three hydroxyl groups.

16. A method as set forth in claim 15, wherein said alcohol containing at least three hydroxyl groups is a member selected from the group consisting of glycerol, trimethylol propane, 1,3,6-hexanetriol, trimethylol ethane, pentaerythritol, sorbitol, glucose and mixtures thereof.

17. A method as set forth in claim 15, wherein said polyol mixture contains a diol selected from the group consisting of ethylene glycol, propylene glycol, 1,3-butylene glycol, diethyl glycol, 1,4-cyclohexane diol, neopentyl glycol, bis-phenol A, hexamethylene glycol, p-dihydroxy dimethyl benzene, hexahydroresorcinol, hydroquinone, polyalkylene glycols, and mixtures thereof.

18. A method as set forth in claim 12, wherein said polybasic carboxylic acid anhydride to be reacted to said backbone polymer is a member selected from the group consisting of anhydrides of maleic acid, chlorinated maleic acid, succinic acid, itaconic acid, α-methylene glutarin acid, citraconic acid, phthalic acid, tetrahydrophthalic acid, hexahydrophthalic acid, tetrabromophthalic acid, naphthalene dicarboxylic acid, dodecenyl succinic acid, endo-methylene tetrahydrophthalic acid, methyl-endo-methylene tetrahydrophthalic acid, hexahydrophthalic acid, and 1,4,5,6,7,7 - hexachloro - bicyclo-[2,2,1]hept-6-en-2,3-dicarboxylic acid.

19. A method as set forth in claim 12, wherein said vinyl monomer is a member selected from glycidyl esters of α,β-olefinically unsaturated acids and glycidyl ethers of hydroxyl group-containing vinyl monomers.

20. A method as set forth in claim 19, wherein said glycidyl ester is glycidyl acrylate ester or glycidyl methacrylate ester.

21. A method as set forth in claim 19, wherein said glycidyl ether is allyl glycidyl ether, methallyl glycidyl ether or vinyl cyclohexane monoxide.

22. A coating composition comprising (A) a crosslinkedly hardening polyester prepolymer comprising a backbone chain formed from a non-crystalline polyester of a molecular weight of 300 to 5,000 which is a polycondensation product of a polybasic carboxylic acid component and a polyol component and contains hydroxyl groups with a hydroxyl value of 20 to 200 mg. KOH/g.; and at least one pendent side chain substituting said hydroxyl groups of said backbone chain with an ester bonding in a proportion of not lower than 0.5 but not exceeding 7.0 of said side chains with respect to 1,000 molecular weight of said backbone chain, containing at least two ester groups and being terminated with at least one α,β-olefinically unsaturated group; and (B) organic solvent for said prepolymer.

23. A coating composition as set forth in claim 22, wherein said organic solvent is a mixture of 30 to 100% by weight of an acrylic or methacrylic ester and 0 to 70% by weight of a monomer capable of copolymerization with said acrylic or methacrylic ester.

24. A coating composition as set forth in claim 22, wherein said organic solvent is a member selected from reaction products of α,β-olefinically unsaturated carboxylic acids and/or polybasic carboxylic acids and vinyl monomers being terminated with an epoxy group.

25. A coating composition as set forth in claim 22, wherein said organic solvent is a member selected from reaction products of (1) a condensation product of vinyl monomers terminated with a hydroxyl group and/or polyhydric alcohols having at least two pendent hydroxyl groups and polybasic carboxylic acid anhydrides, and (2) vinyl monomers terminated with an epoxy group.

26. A coating composition as set forth in claim 22, wherein said organic solvent is a member selected from reaction products of (1) condensation products of vinyl monomers terminated with a hydroxyl group and polybasic carboxylic acid anhydrides and (2) polyepoxides.

27. A coating composition as set forth in claim 22, wherein said organic solvent is a member selected from condensation products of (1) a reaction product of vinyl monomers terminated with a hydroxyl group and polybasic carboxylic acid anhydrides and (2) polyhydric alcohols.

28. A coating composition as set forth in claim 22, wherein said organic solvent is a member selected from condensation products of (1) reaction products of one or more parts by mol of polyhydric alcohols and two parts by mol of polybasic carboxylic acids and (2) vinyl monomers terminated with a hydroxyl group.

29. A coating composition as set forth in claim 23, wherein said acrylic and methacrylic ester is selected from the acrylic and methacrylic esters wherein a hydrogen atom of the carboxylic group thereof is substituted with a member selected from straight or branched hydrocarbon groups of 6 to 12 carbon atoms, cyclohexyl group, benzyl group and phenethyl group.

References Cited
UNITED STATES PATENTS

| | | | |
|---|---|---|---|
| 3,671,496 | 6/1972 | Masuda et al. | 260—77.5 CR |
| 3,277,035 | 10/1966 | Vegter et al. | 260—75 EP |
| 3,366,706 | 1/1968 | Vasta | 260—75 EP |
| 3,523,143 | 8/1970 | Kwong | 260—75 EP |

WILLIAM H. SHORT, Primary Examiner

E. WOODBERRY, Assistant Examiner

U.S. Cl. X.R.

117—93.31; 204—159.15, 159.19; 260—31.8, 33.4, 861, 75 EP, 873